US 6,609,645 B1

(12) United States Patent
Groel et al.

(10) Patent No.: US 6,609,645 B1
(45) Date of Patent: Aug. 26, 2003

(54) POROUS ROLLER BEARING

(75) Inventors: Peter L. Groel, Longmont, CO (US); Jack L. Marion, Longmont, CO (US)

(73) Assignee: Mountain Engineering II, Inc., Longmont, CO (US)

( * ) Notice: Subject to any disclaimer, the term of this patent is extended or adjusted under 35 U.S.C. 154(b) by 341 days.

(21) Appl. No.: 09/655,894

(22) Filed: Sep. 6, 2000

Related U.S. Application Data

(60) Provisional application No. 60/184,629, filed on Feb. 24, 2000.

(51) Int. Cl.[7] ............................ B65H 20/00; B65H 23/04
(52) U.S. Cl. ....................... 226/190; 226/95; 242/615.2
(58) Field of Search ........................ 226/95, 190, 193; 242/615.12, 615.2

(56) References Cited

U.S. PATENT DOCUMENTS

| | | | | |
|---|---|---|---|---|
| 3,125,265 A | * | 3/1964 | Warren et al. ................. | 226/95 |
| 3,290,795 A | * | 12/1966 | Jarreby ..................... | 242/615.12 |
| 3,554,420 A | * | 1/1971 | Agius ........................... | 226/95 |
| 4,336,900 A | * | 6/1982 | Pontoni .................. | 242/615.12 |
| 4,403,720 A | * | 9/1983 | Grant ......................... | 226/190 |
| 4,925,080 A | * | 5/1990 | Crouse et al. ......... | 242/615.12 |
| 5,199,168 A | | 4/1993 | Daly | |
| 5,232,141 A | * | 8/1993 | Mittmeyer et al. ........... | 226/95 |
| 5,370,292 A | * | 12/1994 | Kurokawa et al. ........... | 226/190 |
| 6,142,409 A | * | 11/2000 | Stewart et al. ............... | 226/193 |
| 6,336,608 B1 | * | 1/2002 | Cope .................... | 242/615.12 |

* cited by examiner

Primary Examiner—Michael R. Mansen
(74) Attorney, Agent, or Firm—Margaret Polson; Patent Law Offices of Rick Martin, P.C.

(57) ABSTRACT

A tape roller bearing is provided that prevents the development of an air film between the roller surface and the tape. The spool surface is made from porous material so that air flows through the spool surface. The porous material vents air uniformly over the roller surface, and the tape remains in direct contact with the roller, even at high speed. The inventive roller has many advantages, including improvement of tape wear characteristics, enhancement of tape guiding abilities, and increased tape speed stability.

13 Claims, 5 Drawing Sheets

POROUS ROLLER BEARING

CROSS-REFERENCE TO RELATED APPLICATION

This application is a non-provisional application claiming the benefits of provisional application No. 60/184,629 filed Feb. 24, 2000.

FIELD OF INVENTION

The present invention relates to guiding of tape by roller bearings, and more particularly to guiding of data tape in a data-recording device using roller bearings in high-speed applications.

BACKGROUND OF THE INVENTION

In tape recording devices, such as audio tape decks, VCRs, and computer tape drives the tape is typically wound from a supply reel across a recording head to a take-up reel. While the tape moves across the recording head it is held under a defined tension, which is required for the recording head to function correctly. The tape is guided through the tape path by one or more bearings. These bearings can be roller bearings, hydrodynamic bearings, or hydrostatic bearings.

One of the common types of data recorder used with computers is a tape drive. Magnetic or other data tape is spooled from a supply reel to a take-up reel past the read-write head assembly. Depending on the type of drive, tape is guided past the read-write head assembly by roller bearings, hydrodynamic bearings or hydrostatic bearings. Roller bearings, also knows as rotating guides or rollers, can have flanges and may be flat or crowned. The rollers are mounted on precision ball bearings. In smaller form factor drives roller bearings are normally employed to save space. The hydrostatic and hydrodynamic bearings are also more expensive than roller bearings.

FIG. 1 shows a partial cutaway view of a prior art roller bearing 100. Two bearings 3 and 8 are coaxially mounted on a shaft 1 so that spool 7 (also known as a roller) is able to rotate around shaft 1. A retainer ring 5 holds the upper bearing 3 in place. A bottom flange 9 and a top flange 4 are used to limit the movement of the tape off the spool 7. The top flange 4 is held in place by belleville washer 6 and retainer ring 2. The bottom flange 9 is mounted on the base plate (not shown).

When the tensioned tape moves at a low speed across the roller bearings the spool 7 rotates smoothly around the shaft 1. However, many applications require an increase of the tape speed in order to reduce the recording time. At high speed the tape itself generates air currents around it as it moves, just as any other moving object will such as a train or car. As the tape speed increases the air currents moving with the tape cause an air film to develop between the spool surface and the tape, lifting the tape off the spool surface. The separation of the tape from the surface of rotating spool is undesirable for a number of reasons.

First, the air film is turbulent and causes the tape to flutter. The tape must be stable at the recording head to accurately record and read data on the tape, particularly with new recording technologies using increasingly small bit cells of data. The instability of the tape increases errors significantly in both reading from, and writing to, the tape.

FIG. 5 shows the effect of air on the tape 14 when a prior art roller bearing 100 is used. The roller bearing 100 has two 2 flanges 4 and 9. The tape 14 is moved in the direction of arrow D5 and the spool 7 rotates around shaft 1 in a counterclockwise direction. The movement of the roller bearing 100 and the tape 14 generates airflow in the direction of arrow D6. The air is trapped between the tape 14 and the roller spool 7 and exits as indicated by arrow D7. The resulting air film that separates the tape from the spool 7 is often unstable, as shown in FIG. 5. The effects of the air instability on the tape are exaggerated in FIG. 5 in order to show the effects more clearly.

Another problem that can occur when the tape lifts off the spool surface is that the spool will slow down and can stop rotating completely. The air turbulence can even rotate the spool in the reverse direction. As the movement of the tape slows down during a stop operation the air film dissipates and the moving tape contacts the surface of the spool. The tape rubs over the surface of the spool until the speed and direction of rotation of the spool matches the speed of the tape. This results in increased tape wear and in contamination of components in the tape path, including the recording head.

The spool also has an inertia that dampens the tape movements as long as the spool and the tape stay in contact. Therefore, the dampening effect of the rollers being in contact with the tape helps to stabilize the tape speed. This dampening of the tape has a highly desirable effect, as it helps compensate for tape speed variations caused by other parts of the tape drive system. These sudden speed variations of the tape are caused by, among other things, interlayer slip in the cartridge hub. Increasingly higher bit densities and newer recording technologies, such as PRML, require very stable tape speeds.

Devices that measure the tape speed, such as optical tachometers, are typically mounted to the roller/spool. In order to function these devices require that there be no separation between the tape and the spool surface.

In the past, roller bearings have been used only at low and medium tape speed. To increase the tape speed and dissipate the air film, grooves have been added to the spool surface. FIG. 2 is a partially sectioned view of a roller bearing with three grooves 11. The roller bearing 200 comprises a steel shaft 1, coaxially mounted ball bearings 3, 8, flanges mounted to guide tape 4, 9, retainer ring for bearings 5, belleville washer 6, a rotating spool 7 and air bleed grooves 11.

At medium speed the grooves can be effective in preventing the development of an air film. However, at high speed the grooves can no longer dissipate enough air and the air film still develops. This limits the usefulness of the grooves and prevents roller bearings from being used in high-speed applications.

In addition, grooves can damage the tape itself in certain circumstances. In new tape cassettes the recording tapes are becoming longer, and therefore thinner, to increase the tape recording capacity. Thin tape can indent into the grooves as the tape moves across the spool. The indentation can permanently deform the tape. Recording in the area of the deformation results in high number of errors or may not be possible at all. The venting capacity of the grooves increases with their size and number, allowing for higher speed, but also causing increased tape damage.

U.S. Pat. No. 5,199,168 to Daly discloses a spool that attempts to minimize the tape damage caused by the grooves, while maximizing the grooves' venting capacities. FIG. 4 shows two circumferential grooves 52 and 54 located one on each end of a spool. Between the two circumferential grooves is a single helical groove 50 that is angled obliquely to the longitudinal axis of the spool.

The oblique orientation of the groove minimizes tape deformation. The oblique orientation will, however, affect the guiding ability of the roller bearing. This helical groove causes the roller bearing to guide the tape differently in each direction, causing instability in the tape, particularly when the direction of movement of the tape is changed frequently. This reduces the usefulness of the helical groove in tape drive applications, as tape direction changes frequently.

In the current market there is an ever-increasing demand for smaller, faster, less expensive, but very accurate, tape recording devices of all types. This has caused a difficult design choice between the smaller, cheaper, but slower, roller bearings; or the larger, more expensive, but faster, hydrostatic or hydrodynamic bearings. In addition, the dampening effect of the tape being in contact with the spool is highly desirable in tape drives where the speed and direction change frequently.

It is, therefore, an aspect of the present invention to provide an improved method of removing the air film from between the tape and spool to allow roller bearings to be used in high-speed applications.

The present invention solves the problem of air film formation by providing a porous spool which allows the air to be vented through the spool. The pores are small enough that tape damage does not occur even with thin tape.

SUMMARY OF THE INVENTION

The primary aspect of the present invention is to provide a roller bearing which will allow high speed movement of the tape over the spool without an air film developing.

Another aspect of the present invention is to provide a roller bearing that guides tape equally well in both directions.

Another aspect of the present invention is to provide a roller bearing that will not cause tape damage.

Another aspect of the present invention is to provide a roller bearing that, when combined with a tachometer, will provide accurate measurements of tape speed.

Other aspects of this invention will appear from the following description and appended claims, reference being made to the accompanying drawings forming a part of this specification wherein like reference characters designate corresponding parts in the several views.

A spool is provided which is made of rigid, porous material. The pores allow the air to dissipate through the spool. This prevents an air film developing between the tape and spool at high speeds, thereby eliminating slip and improving guiding.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
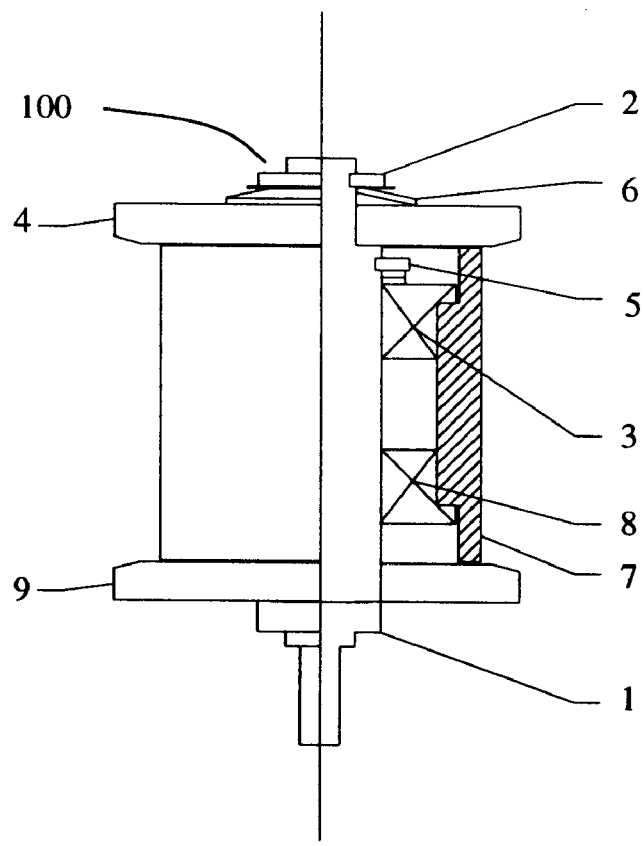
FIG. 1 is a partially sectioned view of a prior art smooth guide roller bearing.
Figure 2:
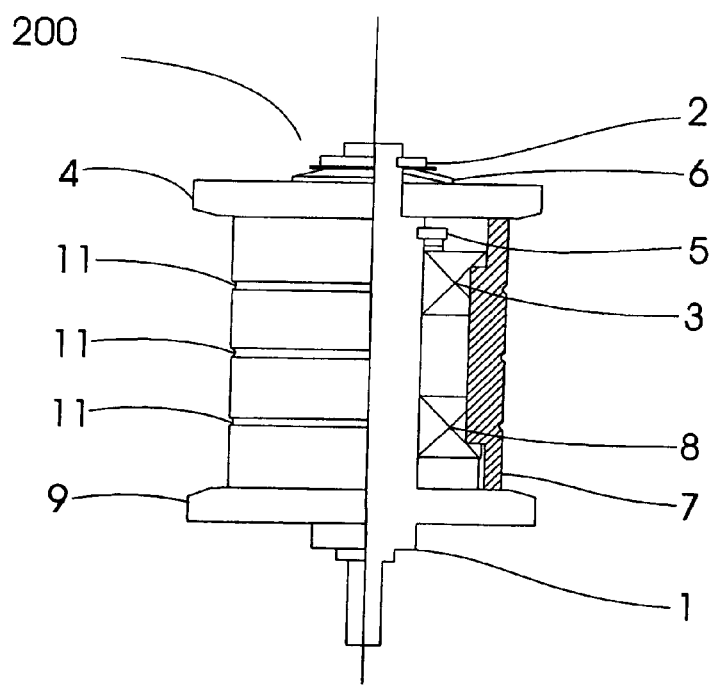
FIG. 2 is a partially sectioned view of a prior art guide roller bearing with grooves.
Figure 3:
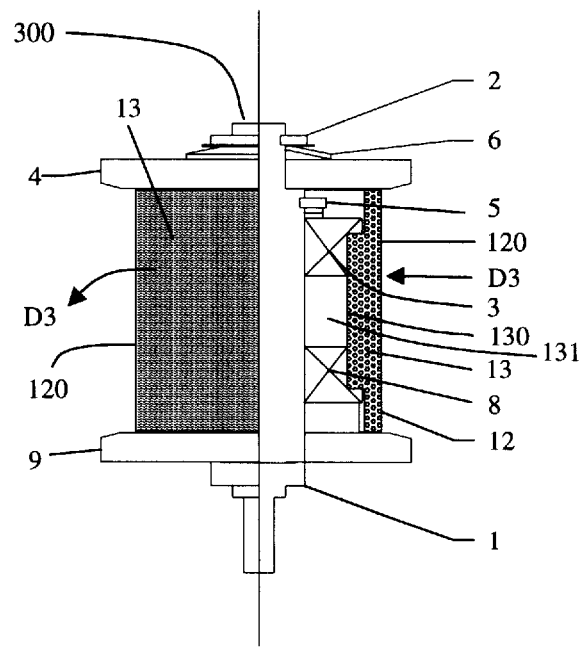
FIG. 3 is a partially sectioned view of the preferred embodiment of the present invention.
Figure 4:
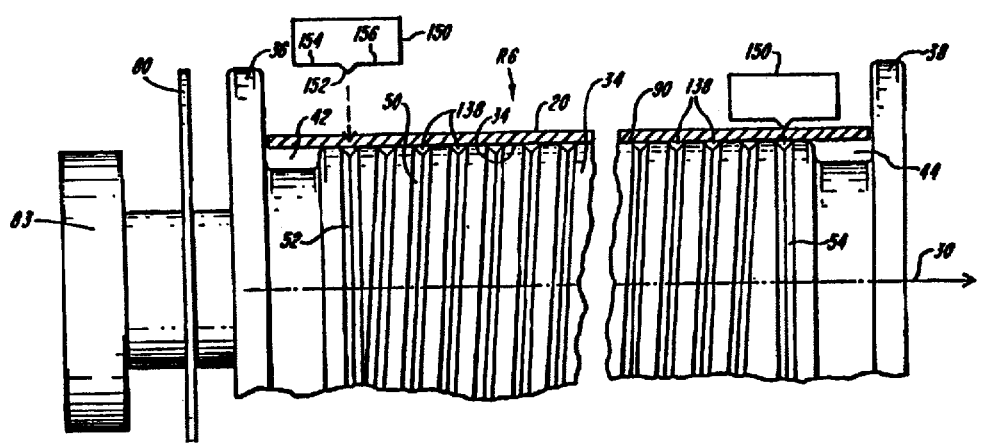
FIG. 4 is a partial side plan view of a prior art roller bearing with helical grooves.
Figure 5:
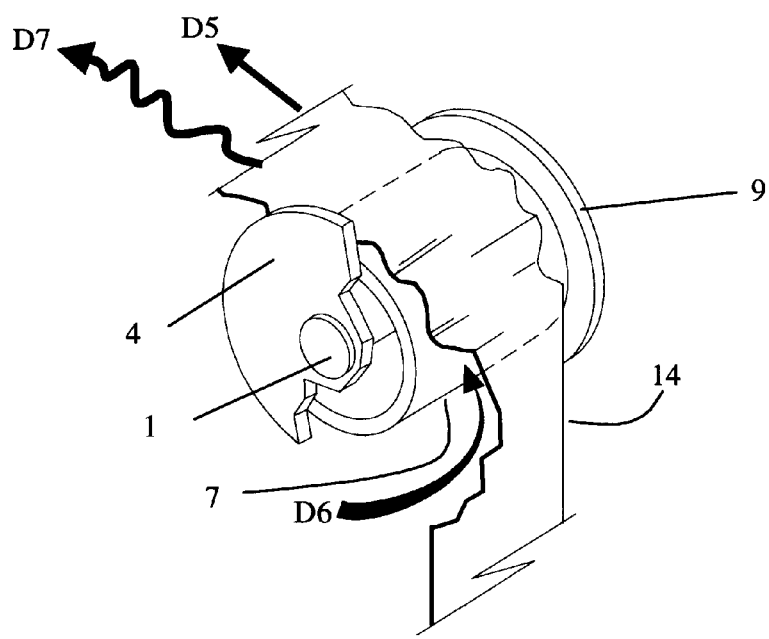
FIG. 5 is a partially sectioned perspective view of the effect of air on the tape caused by a prior art roller bearing.

FIG. 3 shows a partial sectioned view of the present invention. The roller bearing 300 comprises a steel shaft 1, coaxially mounted ball bearings 3 and 8, flanges 4 and 9 to guide the tape, retainer ring for bearings 5, belleville washer 6, a retainer ring 2, and a rigid, rotating spool 12 (also known as a roller) having pores 13 substantially evenly distributed over the movement surface 120. The spool/roller 12 has a given thickness $T_1$ from movement surface 120 to interior surface 130 that defines space 131, which fits over steel shaft 1 and ball bearings 3. The pores 13 dissipate the air currents traveling with the tape and prevent the air film from forming at high speeds of tape movement.

The rotating spool 12 can be made from a plastic, metal or a ceramic material. The porosity of the material is preferably in the range of 30% to 50% open. The pores 13 can either be straight through the spool 12 from movement surface 120 to interior surface 130, or more sponge-like with interconnecting pores, as long as there is an air path through the body of the spool 12. The air path is shown in FIG. 3 by arrow D3 and in FIG. 6 by arrow D70. It is preferred that $T_1$ be as small as possible to reduce the length of the air path, increasing the efficiency of air dissipation. The spool material must remain rigid and have enough structural integrity to withstand the forces of normal operation of the roller bearing 300. If the tape to be used is a magnetic data tape, the spool material should be nonmagnetic such as carbide, alumina, or stainless steels, etc. The preferred movement surface 120 does not impact the tape integrity, nor does it adversely affect the guiding ability of the roller bearing 300 in either direction.

In the preferred embodiment the porous material is alumina, such as Kyocera part #220, Kyocera Industrial Ceramics of San Jose, Calif. With alumina the spool 12 can have a thickness $T_1$ of approximately 0.075 mm or less. This very short air path allows the passage of air through the spool 12 in a quantity to deplete the air film at higher velocities. It is also possible to make the spool 12 conductive, in order to reduce static build-up on the tape.

In an alternate embodiment, porous plastic such as Porex Technologies of Fairburn, Ga., part #X-531, can be used for the porous material for the spool 12. However, the alumina was preferred because the plastics are difficult to machine to the necessary tolerance. In addition, use of the plastic required a greater thickness $T_1$ of 3.2 mm in order to make the spool 12 rigid. This greater thickness $T_1$ reduced the airflow through the spool 12.

The pores 13 in the spool 12 may be formed in the material manufacturing process or in a post-machining operation such as drilling. To avoid tape damage the material is polished or lapped to provide a smooth movement surface 120 for the tape 14 contact. Controlling the surface texture of the spool 12 is important in order to reduce tape wear. Care must be taken during the lapping process to avoid filling the pores 13 with lapping compounds which can reduce airflow. A desired average roughness for the spool 12 movement surface 120 is between 0.003 and 0.009 micrometers.

A typical pore 13 size for the material is approximately 250 micrometers. The pores 13 vent the air through the spool 12 equally over the entire movement surface 120 of the spool 12. Due to the small size of the pores 13 tape damage is avoided.

An additional aspect of the invention is that the porous roller bearing 300 guides tape equally well when tape 14 is moved forward, as when tape 14 is moved backward. Data is recorded in both directions of tape movement in tape drives, so the preferred bearing must guide equally well in both directions. Since the porous roller bearing 300 has a roughly equally distributed, large number of small pores 13, the air is dissipated equally over the surface of the spool 12, with no preference of the direction of tape movement.

Figure 6:
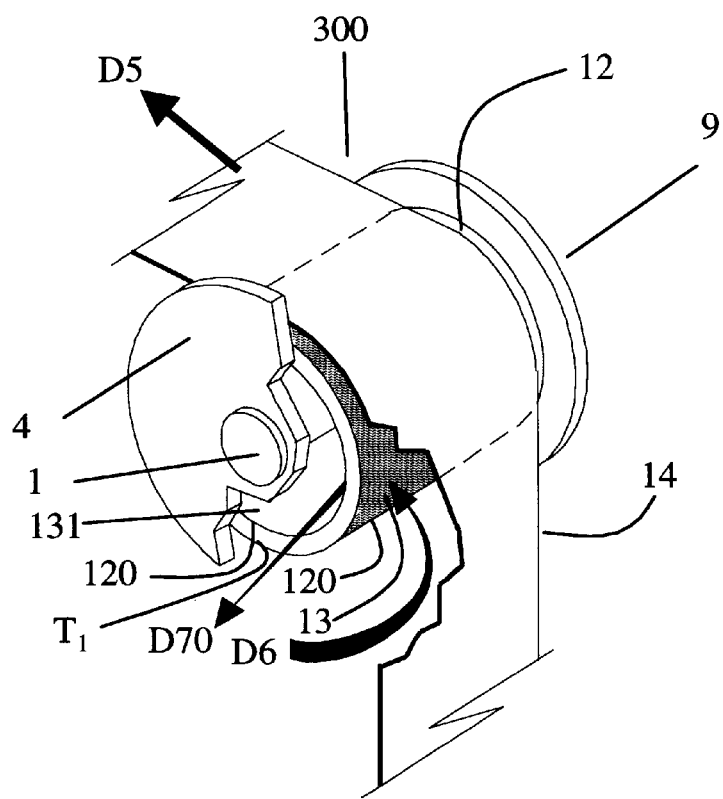
FIG. 6 is a partially sectioned perspective view of airflow around the roller bearing of the present invention.

FIG. 6 shows the dissipation of air with the preferred embodiment. The movement of the spool 12 and the tape 14 generates airflow in the direction of arrow D6. The air flows through the low resistance path of the porous surface of the spool 120 and exits through interior surface 130 as indicated by arrow D70. Most of the air goes through the spool 12, a path of least resistance, as compared to forcing its way between the tape 14 and the spool surface 120.

The present invention could be used in any data-recording device using a data tape or other device where a tape is guided by a roller bearing.

Figure 7:
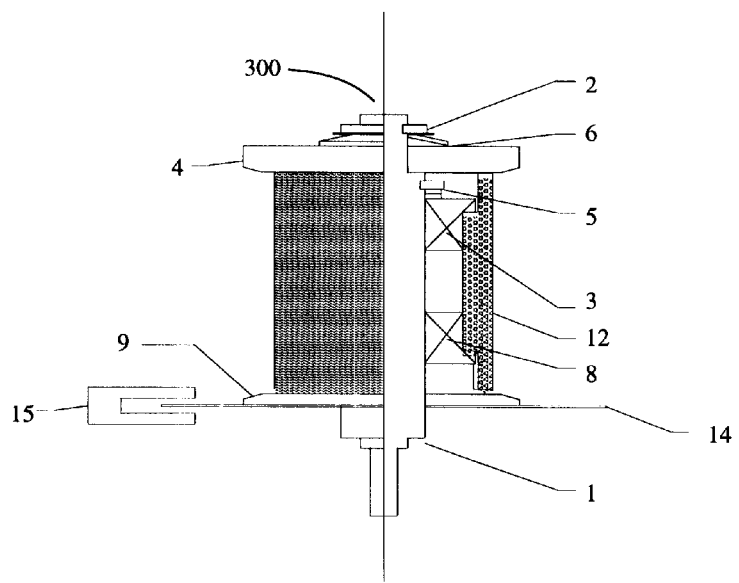
FIG. 7 is a side perspective view of the present invention with a tachometer attached to measure tape speed.

Another aspect of the present invention is that the spool 12 no longer spins at a different rate than the tape 14, so that it is now feasible to accurately and consistently measure tape speed by measuring spool speed. FIG. 7 shows the roller bearing 300 with a tachometer encoder disk 14 attached to flange 9, and thereby to spool 12. The movement of the tape 14 causes the spool 12 and the attached encoder disk 14 to rotate.

The rotation of the disk 14 is sensed by encoder module 15. The encoder module 15 measures of the angle of the rotation of the roller spool 12 and thus of the distance of the tape movement. When measured over time, the speed of the tape movement can be determined in a known manner.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A roller in a tape transport device to dissipate air currents caused by the movement of a tape over the roller comprising, said roller having an outer movement surface, and interior space, and a a thickness $T_1$ between said outer movement surface and said interior space;

the roller being rotatably mounted on a shaft;

the roller being made of a porous material to allow air to flow through the roller from the outer movement surface to the interior space;

said roller being rotated around the shaft by the movement of the tape in operation of the tape transport device;

said interior space being at approximately ambient air pressure.

2. The roller of claim 1, wherein said porous surface has a porosity ranging from 30–50% open.

3. The roller of claim 1, wherein said roller is made from a solid material having a multitude of small holes therein.

4. The roller of claim 3, wherein said roller is made of ceramic.

5. The roller of claim 3, wherein said roller is made of metal.

6. The roller of claim 5, wherein said metal is alumina.

7. The roller of claim 6, wherein the thickness $T_1$ is approximately 0.075 millimeters or less.

8. The roller of claim 1, wherein said movement surface has an average roughness between 0.003 and 0.009 micrometers.

9. The roller of claim 1, wherein the roller is comprised of an electrically conductive material to reduce a static build up.

10. An improved roller bearing for guiding a data tape, said roller bearing having a spool rotatably mounted on a shaft having at least one ball bearing, wherein the improvement comprises:

said spool having a movement surface, an interior space and a thickness $T_1$ between said movement surface and said interior space:

said spool being made of a porous material, said interior space being at approximately ambient air pressure;

thereby allowing for dissipation of air currents caused by the data tape.

11. The improvement of claim 10, wherein the porous material further comprises a porosity ranging from 30–50% open.

12. The improvement of claim 11, wherein the porous material is made from a solid material having a multitude of holes therein.

13. The improvement of claim 12, wherein the porous material has a thickness of approximately 0.075 millimeters or less.

* * * * *